(12) United States Patent
Pingel et al.

(10) Patent No.: US 7,554,678 B2
(45) Date of Patent: Jun. 30, 2009

(54) DEVICE AND METHOD FOR MEASURING THE THICKNESS OF A TRANSPARENT SAMPLE

(75) Inventors: Ulrich Pingel, Marl (DE); Stefan Leute, Bochum (DE); Paul Weigt, Bochum (DE)

(73) Assignee: Isra Surface Vision GmbH, Herten (DE)

( * ) Notice: Subject to any disclaimer, the term of this patent is extended or adjusted under 35 U.S.C. 154(b) by 174 days.

(21) Appl. No.: 10/587,762

(22) PCT Filed: Dec. 22, 2004

(86) PCT No.: PCT/EP2004/014560

§ 371 (c)(1),
(2), (4) Date: Jul. 28, 2006

(87) PCT Pub. No.: WO2005/085751

PCT Pub. Date: Sep. 15, 2005

(65) Prior Publication Data

US 2007/0052978 A1    Mar. 8, 2007

(30) Foreign Application Priority Data

Mar. 3, 2004   (DE) .................. 10 2004 010 311

(51) Int. Cl.
*G01B 11/06* (2006.01)

(52) U.S. Cl. .................................... 356/632
(58) Field of Classification Search ............. 356/371, 356/630–632, 445, 124, 369; 65/377, 378, 65/29.12, 29.14; 250/559.27, 559.28
See application file for complete search history.

(56) References Cited

U.S. PATENT DOCUMENTS 5,210,592 A    5/1993   Bretschneider (Continued)

FOREIGN PATENT DOCUMENTS

DE    40 35 168    5/1992

(Continued)

*Primary Examiner*—Tarifur Chowdhury
*Assistant Examiner*—Michael LaPage
(74) *Attorney, Agent, or Firm*—Michael J. Striker

(57) ABSTRACT

The invention relates to device for measuring the thickness of a transparent sample (2), particularly a glass strip or a glass pane, involving the use of: a first light beam (L1), particularly a first laser beam, which strikes upon the front surface (8) of the sample (2) at a first angle of incidence ($\alpha 1$); a second light beam (L2), particularly a second laser beam, which strikes upon the front surface (8) of the sample (2) at a second angle of incidence ($\alpha 2$), the first angle of incidence ($\alpha 1$) and the second angle of incidence ($\alpha 2$) being different, and; at least one detector (11, 12) for detecting the light beams (L1', L1", L2', L2") of the first and second incident light beams (L1, L2) reflected by the sample, and for determining the position thereof. In order to also be able to carry out a correction for curvature, at least one incident light beam (L3), which is essentially parallel to the first or second light beam (L1, L2), is oriented toward the front surface (8) of the sample (2), and at least one detector (11) is provided for detecting a light beam (L3') of the parallel light beam (L3) reflected by the sample (2) and for determining the position thereof. The invention also relates to a corresponding method.

22 Claims, 5 Drawing Sheets

U.S. PATENT DOCUMENTS

| | | | |
|---|---|---|---|
| 5,251,010 A | 10/1993 | Maltby, Jr. | |
| 5,442,573 A * | 8/1995 | Bredberg et al. | 702/172 |
| 5,636,027 A | 6/1997 | Spengler et al. | |
| 6,285,451 B1 | 9/2001 | Herron | |
| 6,549,292 B1 | 4/2003 | Schmidt et al. | |
| 2005/0046874 A1 * | 3/2005 | Caton et al. | 356/630 |

FOREIGN PATENT DOCUMENTS

| | | |
|---|---|---|
| DE | 41 43 186 | 7/1993 |
| DE | 44 34 822 | 1/1996 |
| EP | 0 485 043 | 5/1992 |
| JP | 8014840 | 1/1996 |

* cited by examiner

DEVICE AND METHOD FOR MEASURING THE THICKNESS OF A TRANSPARENT SAMPLE

The invention relates to a device for measuring the thickness of a transparent sample, in particular a glass strip or a glass pane, which preferably has smooth surfaces, having a first light beam, in particular a first laser beam, incident on the front surface of the sample obliquely at a first incident angle, having a second light beam, in particular a second laser beam, incident on the front surface of the sample obliquely at a second incident angle, the first incident angle and the second incident angle being different, and having at least one detector for detecting the light beams of the first and second incident light beams reflected by the sample, and for determining their position. The invention also relates to a corresponding method for thickness measurement that can preferably be carried out with the aid of the device in accordance with the present invention.

Glass thicknesses are standardized in the production of glass panes, glass strips or the like. These standard thicknesses are provided with tolerances that are to be observed during production. Substantial quantities of glass can be saved in mass production if it is possible to fabricate at the lower tolerance limits by continuous measurement of the thickness and by a stable process. Furthermore, the yield of good glass can be increased if it is possible to enlarge the width of the marketable glass within the prescribed machine width on the basis of a good control possibility. Even when switching between thicknesses at a float glass plant, it is possible to minimize the times when passing over from one thickness to the other given a continuous possibility for measurement, and this likewise increases the yield of marketable glass.

Devices for contactless automatic measurement of the thickness of transparent materials in which laser beams are projected onto the surface to be measured at a specific angle are known for monitoring the glass or material thickness of transparent materials. The laser beam is partially reflected at the front side of the measurement object. A further part of the beam is refracted into the material, reflected at the rear side and refracted again at the front side such that the two light beams are retroreflected by the measurement object. The spacing of the two reflections is a measure of the thickness of the measurement object and is correspondingly evaluated.

In order to obtain reliable measured values even given nonparallel surfaces of the measurement object and despite tilting between the measurement object and measuring device, DE 41 43 186 A1 proposes a device having respectively two laser light sources, two beam splitters and two line sensors that are arranged symmetrically at a deflecting prism in a way such that the beams from the laser light sources are guided onto the measurement object in changing directions, and the reflections at its front and rear sides fall in turn onto the line sensors through the deflecting prism and the beam splitters. There is the disadvantage here that the beam path is comparatively complicated and a multiplicity of optical elements are required. In addition, it is not possible to detect and to correct a curvature of the material sample, and so the measurement results are affected by substantial measurement inaccuracies.

It is therefore an object of the invention to propose a possibility of thickness measurement that can be implemented easily and can determine thickness very accurately.

This object is achieved in the case of a device of the type mentioned at the beginning essentially by virtue of the fact that at least one incident light beam substantially parallel to the first or second light beam is directed toward the front surface of the sample, and in that at least one detector is provided for detecting a light beam, reflected by the sample, of the parallel light beam, and for determining its position. By installing a further laser beam parallel to the first or second laser beam incident on the left or right, and by reflecting these parallel beams at the front surface of the sample, for example, a possible radius of curvature of the sample can be determined in the surface section examined. For this purpose, the spacing of these two reflected beams is measured at a known distance from the glass. A correction for the thickness of the sample that is to be measured can then be derived from a knowledge of the radius of curvature. It is possible on the basis of this arrangement with three incident beams to carry out an inclination correction, a wedge angle correction and a curvature correction in a simple way such that the thickness sensor in accordance with the inventive device supplies a high precision for the thickness determined, doing so in conjunction with a comparatively simple and compact design.

Since the third light beam, incident in parallel, is required only for the curvature correction, it can be provided according to the invention that the third light beam is formed such that it can be switched off in order to avoid when making measurements disturbing influences for which the third light beam is not required. This applies, in particular, to the inclination correction and the wedge angle correction.

In accordance with a preferred embodiment of the present invention, the incident light beams and/or the reflected light beams lie in a common beam plane. Interpretation of the measurement results, and the implementation of the design are then particularly easy.

According to the invention the device and the transparent sample can be moved relative to one another in order, in particular, also to be capable of use in glass production during monitoring of the ongoing production of glass strips and glass panes. This enables a continuous monitoring of the production process. To this end, the device is provided with assigned guide means with the aid of which the sample, for example the glass pane or the glass strip, can be guided past the device. The guide means also serve for aligning the transparent sample in front of the device for measuring its thickness such that the sample can be arranged in a defined alignment in front of the thickness sensor. This particularly serves the alignment of the surface of the sample relative to the optical system of the device, in particular its measuring head.

Since, as a rule, the optical defects transverse to the drawing direction or direction of movement of the glass are larger than the optical disturbances in the drawing direction, it is particularly advantageous in locating these defects when, given a stationary thickness sensor, the relative direction of movement, in particular the drawing direction or direction of movement of the sample, lies in the common beam plane of the incident light beams and/or of the reflected light beams, advantageously perpendicular to the sample normal. Of course, however, the invention can also be applied when the relative direction of movement is arranged not in the common beam plane, but transverse thereto.

In order to achieve a symmetrical design of the thickness sensor that is advantageous for interpreting the measurement results, the first incident angle and the second incident angle can lie in the beam plane, defined by the first and second light beams, on different sides referred to the sample normal in the region of incidence. If, given a nonhorizontal arrangement of the thickness sensor in front of the sample, the sample normal does not lie in the common beam plane, the projection of the sample normal into the beam plane serves as reference. In particular, it is advantageous when the incident angles lying on both sides of the sample normal are equal in absolute terms. They are, for example, of the order of magnitude of 45°.

In order to detect the reflected light beams, according to the invention two detectors can be arranged at a spacing from one another, preferably perpendicular to the surface of the sample, their sensor surfaces preferably being turned toward one another. It is normally possible with such a sensor arrangement to detect in a spatially resolved manner in both detectors all of the incident light beams reflected at the sample. CCD chips, line cameras or other spatially resolving detectors come into consideration as detectors.

It is recommended according to the invention that the region of incidence of the incident first, second and third light beams on the sample is smaller than the spacing of the two mutually opposite detectors, which preferably detect all the reflected light beams. The region of incidence defined by the points of impingement of all the incident light beams on the front surface of the sample is advantageously selected such that all the reflected light beams are detected in the detectors.

In order to minimize the number of light sources, in particular lasers, required, it is possible in accordance with a preferred embodiment to provide two beam splitters in order to produce the three light beams from one light beam. Production of the thickness sensor according to the invention is thereby rendered more cost effective. In addition, the adjustment is more simple overall, since the beams emerging from the beam splitters emerge at a defined angle such that the beam guidance of the system according to the invention is set after adjustment of the original light beam, the beam splitter unit and, if appropriate, two deflecting mirrors that delimit the optical measuring head. Here, the beam splitters can output the output beam at an angle of 90° to the transiting beam. Incident angles of 45° can be produced easily thereby with the aid of two parallel deflecting mirrors that are arranged perpendicular to the imaginary surface normal of the sample. One of the beam splitters for producing the third light beam can be of switchable design here in order to switch the third laser beam on and off.

In order to evaluate the measurement results appropriately, an evaluation device connected to the at least one detector can be provided for determining the thickness of the sample, an inclination correction, an angle correction and/or a curvature correction being carried out, in particular. The subsequently described, inventive method, in particular, is then implemented in this evaluation unit, although it can also be applied without being associated with the previously described device.

In the inventive method for measuring the thickness of a transparent sample, in particular one with smooth surfaces, it is provided that a first light beam is incident obliquely on the front surface of the sample at a first incident angle, and the positions of the light beam reflected at the front surface and of the light beam reflected at the rear surface are determined, and that a second light beam is incident obliquely on the front surface of the sample at a second incident angle, different from the first incident angle, and the positions of the light beam reflected at the front surface and of the light beam reflected at the rear surface are determined, the thickness of the transparent sample being determined from the spacing of the light beams, reflected at the front surface and the rear surface, of the first light beam and/or of the second light beam, and an inclination and/or wedge angle correction being carried out by comparing the positions of at least a portion of the reflected light beams.

In order, in addition, also further to detect a possible curvature of the sample, it is provided that at least a third light beam is incident obliquely on the front surface at a known spacing substantially, that is to say within a possible adjustment accuracy, parallel to the first or second light beam, and a curvature correction is carried out by determining the positions of the light beams, respectively reflected at the front surface and at the rear surface, of these parallel light beams.

The first light beam and the second light beam preferably incident from different sides on the front surface of the sample in the beam plane, defined by them, referred to the sample normal in the region of incidence. In this case the region of incidence is the region in which the incident light beams impinge on the sample. Although, in an advantageous configuration, these lie close to one another in order to keep the overall size of the measuring head as small as possible, they strike the surface at least in a slightly offset fashion in order to avoid a mixing of the different beam paths, something which would require a higher outlay on the measurement and evaluation electronics. During application of the method, the sample and thickness sensor are preferably aligned such that the sample normal lies in the common beam plane of the first and second and, if appropriate, also the third incident and reflected beams.

In order to achieve a high degree of symmetry in the system, something which facilitates the interpretation of the measurement results, the first and the second incident angles can be equal in absolute value, and are preferably approximately 45°.

According to the invention, the spacing from the sample is determined in each case when impinging on the detector from the position of the light beams preferably reflected at the front surface for the purpose of the inclination and/or wedge angle correction, a wedge angle and/or an inclination correction being undertaken when spacings do not correspond. When comparing the spacings from the samples, it is possible to consider a different beam path, for example through incident angles of different absolute value.

According to the invention, from a non-corresponding spacing of the reflected light beams of the first and of the second light beam it is then possible to determine a wedge or inclination angle with the aid of which a correction of the previously determined thickness value is undertaken.

According to the invention, in order to determine a curvature the spacing between the reflected light beams of the third light beam and the first or second light beam, substantially parallel thereto, can be determined, and a curvature correction can be carried out. It is advantageous to this end that the radius of curvature and/or angle of curvature are/is determined from the spacing between the reflected light beams of the third light beam and the first or second light beam substantially parallel thereto. The previously determined thickness value already corrected by the inclination or wedge angle correction is then thereby further corrected.

Furthermore, it is possible according to the invention to use the relationship $D=2/R$ to determine the refractive power $D$ from the radius of curvature $R$.

Further advantages, features and possible applications of the present invention also emerge from the following description of an exemplary embodiment and from the drawing. In this case, all the features described and/or graphically illustrated are part of the present invention, irrespective of their combination in the claims or of their back references.

Figure 1:
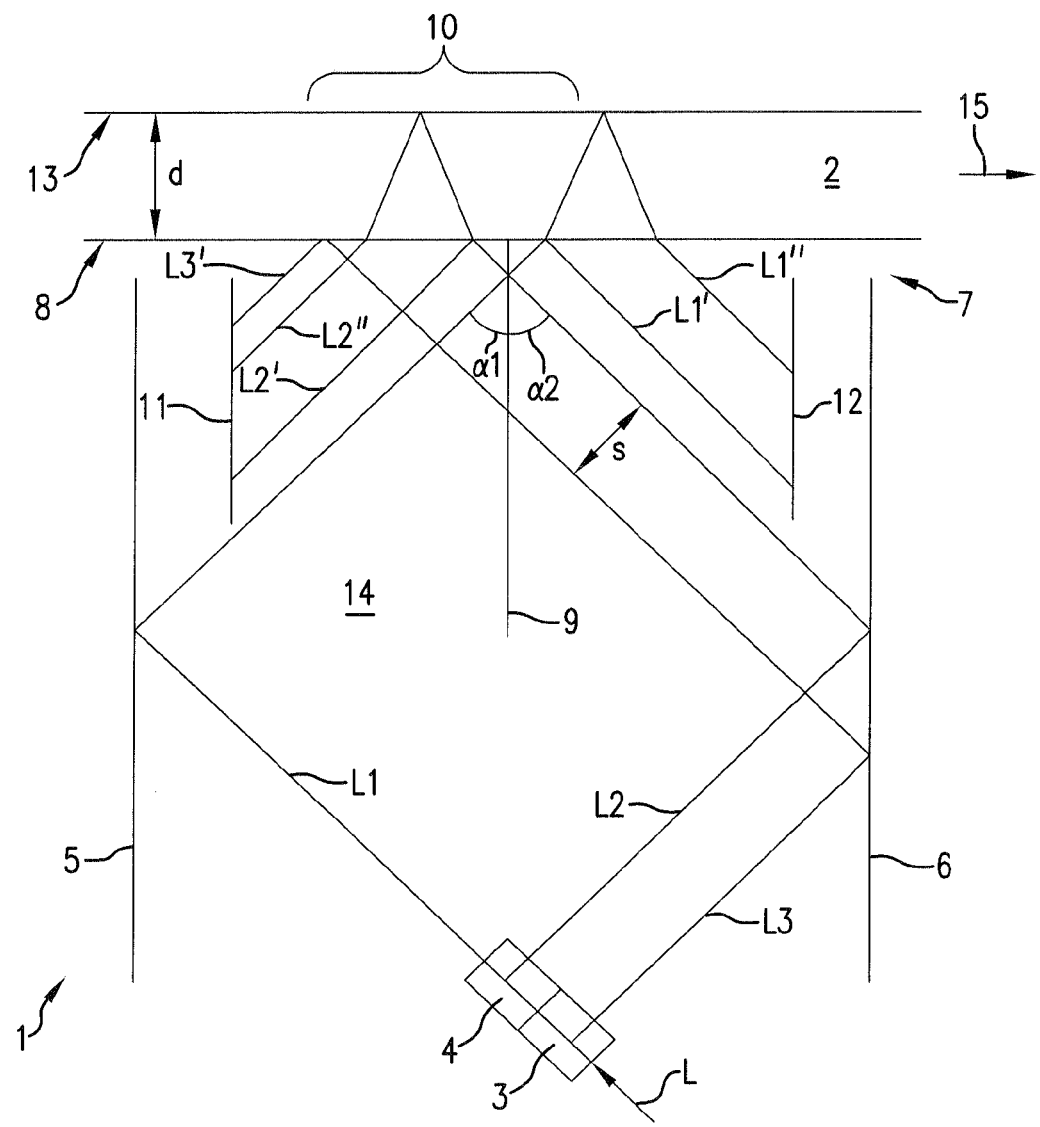
FIG. 1 shows a schematic plan view of an inventive device for measuring the thickness of a transparent sample.

Illustrated schematically in FIG. 1 is a thickness sensor 1 that constitutes a device for measuring the thickness of a transparent sample with preferably smooth surfaces. The sample is a glass strip 2 or a glass pane.

The thickness sensor 1 has a laser (not illustrated) that produces a focused parallel light or laser beam L that runs through two beam splitters 3, 4 arranged one behind another. The laser beam L is split up in the beam splitters 3, 4 into a total of three laser beams L1, L2, L3. The first laser beam L1 traverses the two beam splitters 3, 4 in the direction of laser beam L, strikes a first mirror 5 at an angle of approximately 45° and is reflected there. In the second beam splitter 4, the second laser beam L2 is coupled out of the laser beam L at an angle of approximately 90°, strikes a second mirror 6 at an angle of approximately 45° and is reflected there. The two mirrors 5, 6 delimit the optical beam space, forming the measuring head, of the thickness sensor 1 and are arranged parallel to one another on opposite sides of the beam splitters 3, 4 with reflective surfaces turned toward one another. The mirrors 5, 6 are arranged here perpendicular to the surface of the glass strip 2. An arrangement of the thickness sensor 1 that is substantially mirror-symmetric with regard to laser beams L1 and L2 is thereby achieved. However, the invention is not limited to this advantageous arrangement.

The laser beams L1 and L2 deflected by the mirrors 5, 6 are incident on the front surface 8 of the glass strip 2 through a front opening 7, turned toward the glass strip 2, of the thickness sensor 1 at incident angles α1 and α2 of 45° in each case, the incident angles α1 and α2 having different signs, referred to a sample normal 9, in the region of incidence 10 of the beams L1 and L2 such that, given an incident angle α1 or α2 of equal absolute value, the beams L1 and L2 are incident on the front surface 8 of the glass strip 2 from different directions, specifically from the left and right.

There, the incident beams L1 and L2 are partially reflected and are incident as reflected laser beams L1', L2' on appropriately arranged detectors 11, 12. Another portion of the incident light beams L1 and L2 is refracted into the glass strip 2, reflected at the rear surface 13 and emerges from the glass strip 2 after renewed refraction at the front surface 8. These further laser beams L1" and L2" reflected at the rear surface 13 run substantially parallel to the light beams L1' and L2' reflected at the front surface and also are incident on the detectors 11, 12.

To this end, the detectors 11, 12 are respectively arranged in a parallel fashion in front of a mirror 5, 6, and have sensor surfaces that are turned toward one another and are substantially aligned perpendicular to the surface 8 of the glass strip 2. The detectors 11 and 12 are arranged such that they respectively can collect the two reflected laser beams L1' and L1" or L2' and L2" of the first and second incident laser beam L1 and L2, respectively, and can determine their position. The detectors 11, 12 have position-resolving sensors with the aid of which the position of a light beam incident on them can be accurately determined. CCD chips, line cameras or such sensors are suitable for this purpose.

Produced in the beam splitter 3 upstream of the beam splitter 4 is an incident laser beam L3 that is parallel to the second incident laser beam L2 and is, like the laser beam L2, deflected at the mirror 6 and runs parallel to the laser beam L2 at a spacing s within the range of accuracy of assembly. The third laser beam L3 strikes the front surface 8 of the glass strip 2 in the region of incidence 10. Here, the region of incidence 10 is defined by the region in which the incident laser beams L1, L2 and L3 strike the front surface 8. This region of incidence 10 is smaller than the spacing of the two opposite detectors 11, 12, and extends approximately over half their spacing. The arrangement of the laser beams L1, L2, L3 and the detectors 11, 12 is selected such that the reflected beams L2', L2" and L3' of the second and third incident beams L2 and L3 are incident on the sensor surface of the detector 11, and the reflected beams L1' and L1" of the first incident beam L1 are incident on the sensor surface of the detector 12.

The known position of the detectors 11, 12 in the thickness sensor 1 and relative to the glass strip 2 or an optimum measuring position thereof can be used to determine the accurate positions of the reflected laser beams L1', L1", L2', L2" and L3' in absolute terms relative to the front surface 8 of the glass strip 2 and/or relative to one another. In an evaluation device (not illustrated), this information can be used to determine the thickness d of the glass strip 2 and to carry out an inclination, wedge angle and curvature correction.

The three incident light beams L1, L2 and L3 define a common beam plane 14 in which the sample normal 9 also lies. Consequently, the reflected light beams L1', L1", L2', L2" and L3' also lie in the beam plane 14. Even if this arrangement is preferred, it is also possible in the case of an inventive thickness sensor 1 for the beam planes of the incident and the reflected laser beams to fall apart. In this case, the sample normal also does not lie in one of the beam planes.

The previously described thickness sensor 1 can be used, in particular, in order to measure the thickness d of the sample 2, in particular a glass strip or a glass pane, immediately during production. In this case, the glass strip 2 or the glass pane is then moved past the thickness sensor, and the thickness d of the sample 2 is measured continuously or at prescribed time intervals. The direction of movement 15 of the glass strip 2 then preferably also lies in the common beam plane 14.

The inventive method for determining the thickness d is explained below. The method is preferably carried out with the aid of the thickness sensor 1, which is, in particular, arranged perpendicular to the glass strip 2.

In order to determine the thickness d of the glass strip 2, the thickness d of the glass strip 2 is firstly calculated from the spacing d' of the laser beams L1', L1" reflected from the first laser beam L1 at the front and the rear surfaces 8, 13 of the glass strip 2. Assuming that, given parallel front and rear surfaces 8, 13, the glass is completely flat, and the incident angle α1 is accurately known, the thickness d can be determined with the aid of a simple method that will be explained below with the aid of FIG. 2.

Figure 2:
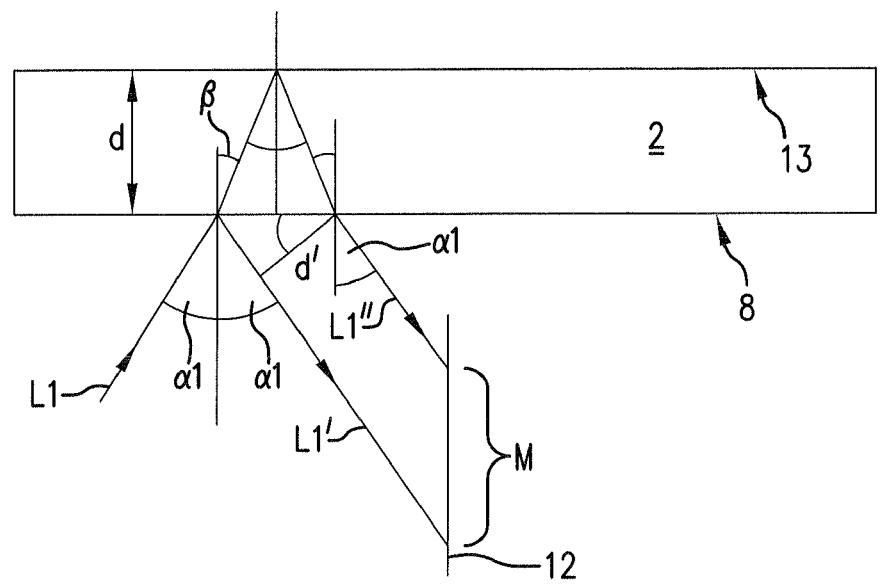
FIG. 2 shows a schematic overview of the beam path for a thickness determination.

The laser beam L1 incident from the left at an incident angle α1 in the illustration in accordance with FIG. 2 is partially reflected at the front surface 8 of the glass strip 2 and emerges as reflected laser beam L1' at the same emergent angle α1. Another part of the laser beam L1 is refracted into the glass strip 2, reflected at the rear surface 13 of the glass strip 2 and emerges as reflected beam L1" at the same emergent angle α1 in a fashion offset parallel to the laser beam L1' reflected at the front surface 8.

The perpendicular spacing d' between the two reflected beams L1', L1" is determined from the position data of the beams L1' and L1" on the detector 12 by using the known incident and emergent angle α (α1 for L1) and the arrangement of the detector 12 with reference to the glass strip 2.

The thickness d of the glass strip 2 is then yielded from the relationship $$d = d' \cdot \frac{\sqrt{n^2 - \sin^2 \alpha}}{\sin 2\alpha},$$

d' being the perpendicular spacing between the reflected beams L1', L1", n being the refractive index, and α being equal to the incident angle α1. The spacing d' is yielded from the measured spacing M of the beams L1' and L1" on the detector 12 from the relationship d'=M·sin α.

In a corresponding way, the thickness of the glass strip 2 can be determined for the laser beam 12 incident from the right at the incident angle α2. This results in two first thickness values d1 and d2 that correspond in the ideal case.

However, in practice the previously mentioned assumptions of a known unchanging incident angle α and a flat, parallel sample surface do not obtain.

Furthermore, there are optical disturbances transverse to the drawing direction or direction of movement 15 of the glass strip 2. Because the optical disturbances in the drawing direction 15 are substantially smaller as a rule, the three beams L1, L1' and L1" are to lie in a common beam plane 14 with the drawing direction 15 of the glass strip 2. The influence of this disturbance on the practical application can be eliminated by this geometric arrangement.

The glass strip 2 can, for example, also be inclined on a roller track such that the incident angle α=α1, α2 can assume different values. For the correction, use is made of the second incident laser beam L2, which is incident not from the left, but from the right and lies in the same beam plane 14. At the same time, a wedge angle, possibly present, of the glass strip 2 can also be determined and corrected with the aid of this system, the method steps being explained below with the aid of FIGS. 3 and 4.

When the incident beam L1 is reflected not at a glass strip 2 that is aligned perpendicular to the thickness sensor 1 and in the case of which the sample normal 9 coincides with the axis of symmetry of the thickness sensor, but at a glass strip 2 inclined by an inclination angle σ, the emergent angle in the beam plane 14 is not equal to the imaginary incident angle α=α1, but amounts to α=α1+σ.

Figure 3:
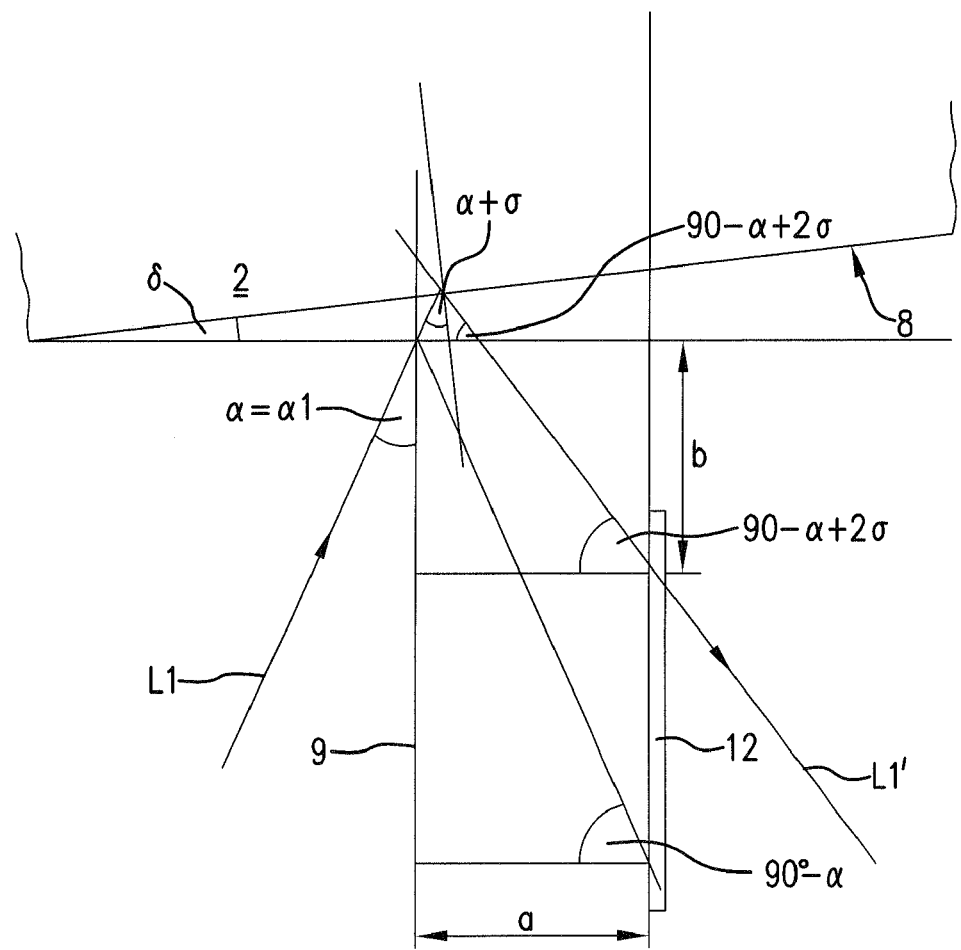
FIG. 3 shows a schematic overview of the beam path for an inclination correction.

Use is made for the inclination correction not only of the beam L1 incident from the left, but also of the beam L2 incident from the right which, for the sake of clarity, is not depicted in FIG. 3. Instead of this, for a comparison a light beam exiting at a horizontal glass strip 2 at the emergent angle α1 and which corresponds to the beam L1' from FIG. 2 is illustrated without a reference symbol.

The incident angle α for the second beam L2 is then α=α2−σ. The upshot of this is that the beams L1', L1" and L2', L2" reflected from the first and second beams L1 and L2 no longer strike the detector 11, 12 at the same spacing from the glass strip 2, as would otherwise be the case because of the symmetric design of the thickness sensor 1. Thus, a wedge angle correction must be carried out when the spacing b1 at which the beam L1', reflected at the front surface 8, strikes the detector 12 is not equal to the spacing b2 at which the beam L2' reflected at the front surface strikes the detector 11. This is described below:

In order to determine the inclination angle σ, the spacing b1 of the beam L1' reflected at the front surface 8 from the surface 8 is determined in the detector 12, the spacing b1 being determined in the direction of the sample normal 9 of the uninclined sample 2.

Given knowledge of the spacing a of the detector 12 from the point of impingement of the first beam L1 in the direction of the surface 8 of the glass strip 2, that is to say perpendicular to the sample normal 9, it holds for the beam L1 incident from the left that:

$$tg(\alpha + 2\sigma) = \frac{\alpha}{b_1}.$$

It holds correspondingly for the beam L2 incident from the right (not illustrated in FIG. 3) that:

$$tg(\alpha - 2\sigma) = \frac{\alpha}{b_2}.$$

The difference b1−b2 can be determined from the measured positions or from the beams L1' and L2' reflected at the front surface 8. It is advantageous to select the difference for the calculation, since a constant amount by which the glass band would have been raised overall stands out. The inclination angle σ can be calculated assuming that $\alpha = \alpha_1 = \alpha_2$. The set incident angle α=α1=α2 for the beam L1 or L2 incident from the left or from the right is enlarged or reduced by precisely this angle, and so the incident angle used in the equation in order to determine the thickness d must be appropriately corrected in order to determine the thickness d of the glass strip 2 correctly.

Figure 4:
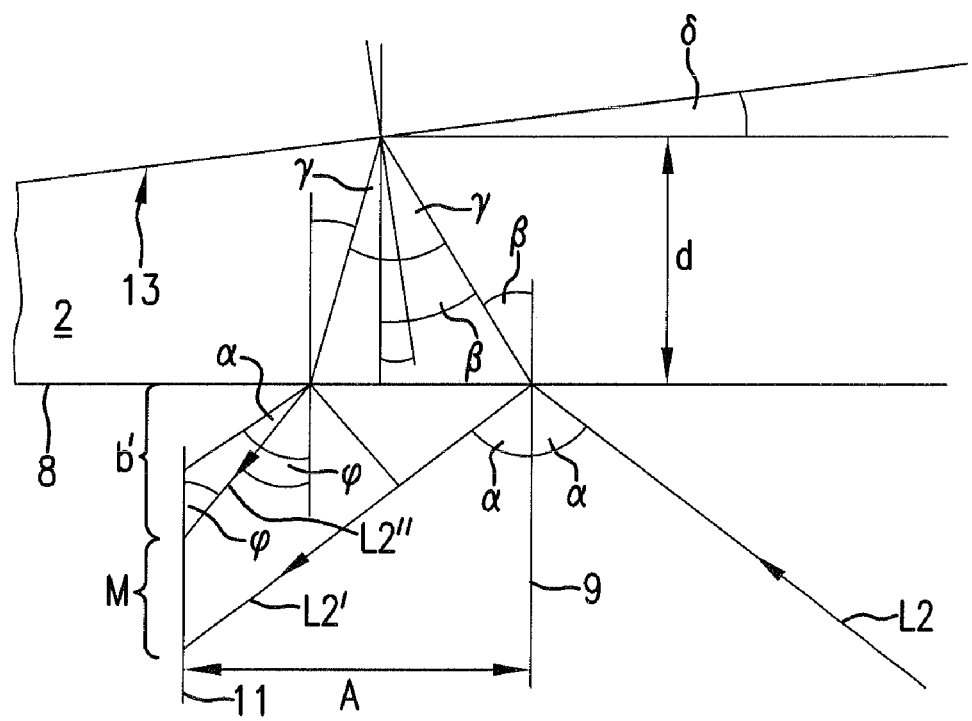
FIG. 4 shows a schematic overview of the beam path for a wedge angle correction.

Furthermore, the glass strip 2 itself can have a wedge angle δ, as illustrated in FIG. 4. When the spacings M1 and M2 between the laser beams L1', L1" and L2', L2" reflected at the front and the rear surfaces 8, 13 are not equal, the glass strip 2 is provided with a wedge. This can be determined from the positions of the reflected beams L1', L1" and L2', L2" on the detector.

Given the presence of a wedge angle δ, it is possible in accordance with FIG. 4 to determine thickness values d1 and d2 respectively for the beams L1 and L2 incident from the left and right, the thickness d of the sample 2 then being yielded from its mean value. It is also possible to average the spacings M1 and M2 between the reflected beams L1' and L1" or L2' and L2", and to determine the sample thickness therefrom.

Figure 5:
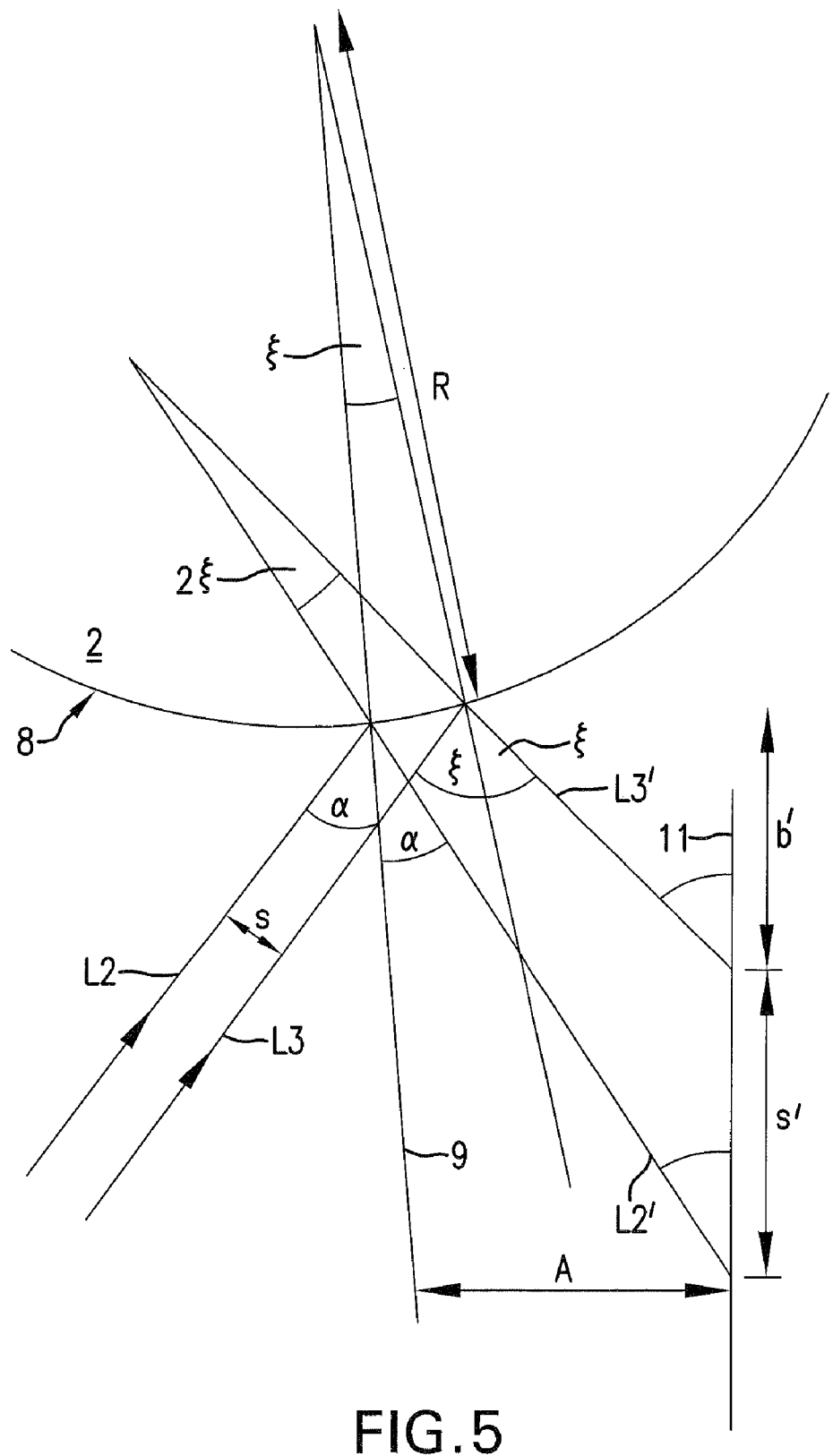
FIG. 5 shows a schematic overview of the beam path for a curvature correction.

In addition, the glass strip 2 can also further be curved. In order to determine this, the third laser beam L3 is irradiated parallel to one of the first two incident beams, the laser beam L2 in the case illustrated, at a spacing s known from the design of the thickness sensor 1. Here, in the example illustrated in accordance with FIG. 5 the beam direction of the beams L2, L3 is reversed by comparison with FIG. 1. However, this is not important for the functional principle. The reflection of the beams L2, L3 at the front surface can be used to determine the radius of curvature R of the sample 2, as is explained below with the aid of FIG. 5.

Figure 6:
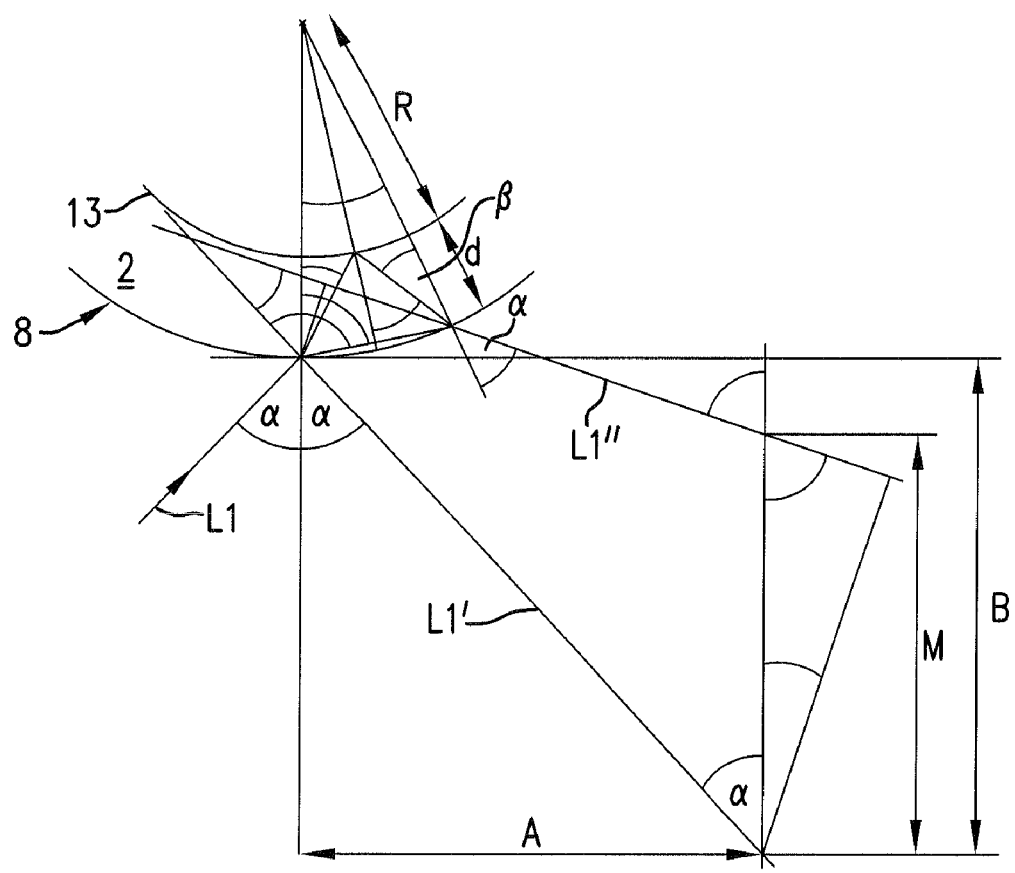
FIG. 6 shows a schematic overview of the beam path for a thickness determination given a curved sample.

The beams L2' and L3' reflected at the front surface 8 of the curved sample 2 are incident on the detector 11 at a spacing S'. A curvature of the under side of the glass strip 2 is present when the spacing S' is not given by the relationship S'=s/cos α given an incident angle α of the incident beams L2 and L3. The positions of the reflected beams L2' and L3' can be used to determine the radius of curvature R, which then features in accordance with FIG. 6 in the calculation of the thickness d of the sample 2.

The measured values are determined in each case for the two incident beams L1 and L2. These then yield two thickness values d1 and d2 from which the mean value is formed. In particular, the incident angles α1 and α2, and therefore also the angles β1 and β2 are different for the two incident beams. They are yielded in the case of the inclination correction for the glass strip 2.

Finally, one further correction can be taken into account, one which is required when the beams L2 and L3 incident in a parallel fashion are still not quite parallel.

The glass or material thickness of a transparent sample can be determined with a high accuracy of 0.1% upon applying the above-described method, in which an inclination correction, a wedge angle correction and a curvature correction are applied one after another. The inventive device is preferably used for this purpose.

| List of reference symbols: | |
|---|---|
| 1 | Thickness sensor |
| 2 | Sample, glass strip |
| 3, 4 | Beam splitter |
| 5, 6 | Mirror |
| 7 | Opening |
| 8 | Front surface |
| 9 | Sample normal |
| 10 | Region of incidence |
| 11, 12 | Detector |
| 13 | Rear surface |
| 14 | Beam plane |
| 15 | Direction of movement |
| L | Light beam, laser beam |
| L1, L2, L3 | Incident laser beams |
| L1', L2', L3' | Laser beams reflected at the front surface |
| L1", L2" | Laser beams reflected at the rear surface |
| a, A | Spacing of the point of incidence of a light beam on the glass strip up to the detector parallel to the glass strip |
| b, B | Spacing of the position of a laser beam on the detector from the glass strip perpendicular to the glass strip |
| d | Thickness of the glass strip |
| d' | Perpendicular spacing between laser beams reflected at the front and the rear surfaces |
| s | Spacing of laser beams incident in parallel |
| M, S' | Spacing of reflected laser beams on the detector |
| R | Radius of curvature |
| α | Incident angle |
| σ | Inclination angle |
| δ | Wedge angle |

The invention claimed is:

1. A device for measuring the thickness of a transparent sample (2), said device comprising:
   a first incident light beam (L1) obliquely incident on a front surface (8) of the transparent sample (2) at a first incident angle (α1);
   a second light beam (L2) obliquely incident on said front surface (8) of the transparent sample (2) at a second incident angle (α2), the first incident angle (α1) and the second incident angle (α2) differing from each other;
   a third incident light beam (L3) parallel to the first incident light beam (L1) or parallel to the second incident light beam (L2), said third incident light beam (L3) being directed toward said front surface (8) of the transparent sample (2);
   a first detector (11) that detects respective reflected light beams (L1', L1") produced by partial reflection of the first incident light beam (L1) from said front surface (8) and from a rear surface (13) of the transparent sample (2), that determines corresponding positions of both of said reflected light beams (L1', L1"), and that determines a spacing between said reflected light beams (L1', L1") produced by partial reflection of the first incident light beam (L1) from said front surface and from said rear surface; and
   a second detector (12) that detects respective reflected light beams (L2', L2") produced by partial reflection of the second incident light beam (L2) from said front surface (8) and from said rear surface (13) of the transparent sample (2), that determines corresponding positions of both of said reflected light beams (L2', L2") and a spacing between said reflected light beams (L2',L2") produced by partial reflection of the second incident light beam (L2) from said front surface and from said rear surface;
   wherein one of said first detector (11) and said second detector (12) is arranged to detect a reflected light beam (L3') produced by partial reflection of the third incident light beam (L3) from the transparent sample (2) and to determine a position of the reflected light beam (L3') produced by partial reflection of the third incident light beam (L3) from the transparent sample (2).

2. The device as claimed in claim 1, wherein said first incident light beam (L1), said second incident light beam (L2), and said third incident light beam (L3) are laser beams.

3. The device as defined in claim 1, further comprising two beam splitters (3, 4) that are arranged to produce said first incident light beam (L1), said second incident light beam (L2), and said third incident light beam (L3) from a single light beam (L).

4. The device as defined in claim 1, further comprising an evaluation device connected to said first detector (11) and said second detector (12) and wherein said evaluation device determines said thickness of the transparent sample (2), an inclination correction, a wedge angle correction and/or a curvature correction.

5. The device as defined in claim 4, wherein said evaluation device determines said thickness and said curvature correction.

6. The device as defined in claim 1, further comprising means for switching off the third incident light beam (L3).

7. The device as defined in claim 1, wherein said first incident light beam (L1), said second incident light beam (L2), and said third incident light beam (L3); said reflected light beams (L1', L1") produced by partial reflection of the first incident light beam (L1); and said reflected light beams (L2', L2") produced by partial reflection of the second incident light beam (L2) are arranged in a common plane.

8. The device as defined in claim 1, wherein said first detector (11) is spaced from said second detector (12) and wherein a region of incidence (10) of said first incident light beam (L1), said second incident light beam (L2), and said third incident light beam (L3) on the transparent sample (2) is smaller than a spacing between said first detector (11) and said second detector (12).

9. The device as defined in claim 1, wherein said first detector (11) and said second detector (12) are spaced apart, have respective sensor surfaces facing each other, and are oriented so that said sensor surfaces are perpendicular to the front surface (8) of said transparent sample (2).

10. The device as defined in claim 1, wherein the first incident angle (α1) and the second incident angle (α2) are arranged in a beam plane (14), which is defined by the first incident light beam (L1) and the second incident light beam (L2), on different sides of a sample normal (9) in a region of incidence (10) of said light beams.

11. The device as defined in claim 1, wherein the transparent sample (2) and the device are movable relative to each other.

12. The device as defined in claim 11, further comprising guide means for guiding and/or aligning the transparent sample during motion of the transparent sample relative to each other.

13. The device as defined in claim 1, wherein the transparent sample (2) is movable relative to the device in a direction of movement (15) and in a common beam plane (14) defined by the incident light beams (L1, L2, L3) and/or the reflected light beams (L1', L1", L2', L2", L3').

14. A method of measuring a thickness of a transparent sample (2), in which:
   a first incident light beam (L1) is incident obliquely on a front surface (8) of the transparent sample (2) at a first incident angle (α1), and respective positions of a reflected light beam (L1') produced by partial reflection of the first incident beam (L1) from said front surface (8) and of a reflected light beam (L1") produced by partial reflection of the first incident beam (L1) from a rear surface (13) of the transparent sample (2) are determined;
   a second incident light beam (L2) is incident obliquely on the front surface (8) of the transparent sample (2) at a second incident angle (α2), said second incident angle (α2) differing form the first incident angle (α1), and respective positions of a reflected light beam (L2') produced by partial reflection of the second incident light beam (L2) from the front surface (8) and of a reflected light beam (L2") produced by partial reflection of the second incident light beam (L2) from the rear surface (13) are determined;
   the thickness of the transparent sample (2) is determined from a spacing between said reflected light beams (L1', L1") produced by partial reflection from the first incident light beam (L1) and/or is determined from a spacing between said reflected light beams (L2', L2") produced by partial reflection from the second incident light beam (L2);
   an inclination correction is carried out, said inclination correction comprising comparing respective positions of said reflected light beams (L1", L2') produced from the first incident light beam and the second incident light beam by partial reflection from the front surface (8) of the transparent sample (2), and/or a wedge angle correction is carried out, said wedge angle correction comprising comparing said spacing between said reflected light beams (L1', L1") produced by partial reflection of the first incident light beam (L1) from the front surface an from the rear surface respectively and said spacing between said reflected light beams (L2', L2") produced by partial reflection of the second incident light beam (L2) from the front surface and from the rear surface respectively;
   a third incident light beam (L3) is incident obliquely on the front surface (8), is parallel to the first incident light beam (L1) or parallel to the second incident light beam (L2), and is spaced at a given spacing form the first incident light beam (L1) or the second incident light beam (L2); and
   a curvature correction is carried out, said curvature correction comprising determining relative positions of the reflected light beams (L3', L1'; L3', L2') produced by partial reflection of the third incident light beam (L3) and of the first incident light beam (L1) from the front surface or produced by partial reflection of the third incident light beam (L3) and the second incident light beam (L2) from the front surface (8), and determining a spacing between the reflected light beams (L3', L1'; L3', L2') produced by partial reflection of the third incident light beam (L3) and the first incident light beam (L1) from the front surface or produced by partial reflection of the third incident light beam (L3) and the second incident light beam (L2) from the front surface.

15. The method as defined in claim 14, wherein the first incident light beam (L1) and the second incident light beam (L2) are incident on the front surface (8) of the transparent sample (2) in a region of incidence (10), in a beam plane (14) defined by the first incident light beam (L1) and the second incident light beam (L2), and from different sides of a sample normal (9) perpendicular to the front surface (8) of the sample (2).

16. The method as defined in claim 14, wherein there first incident angle (α1) and the second incident angle (α2) are equal in absolute value.

17. The method as defined in claim 16, wherein said absolute value is preferably 45°.

18. The method as defined in claim 14, wherein the presence of a wedge angle (δ) is detected when said spacing between said reflected light beams (L1', L1") produced from the first incident light beam (L1) does not correspond to said spacing between said reflected light beams (L2', L2") produced from the second incident light beam (L2).

19. The method as defined in claim 14, wherein a radius of curvature (R) is determined from said spacing between the reflected light beam (L3') produced from the third incident light beam (L3) and the reflected light beam (L1') produced from the first incident light beam (L1) by partial reflection from the front surface or is determined from said spacing between the reflected light beam (L3') produced from the third incident light beam (L3) and the reflected light beam (L2') produced from the second incident light beam (L2) by partial reflection from the front surface.

20. The method as defined in claim 19, wherein refractive power is determined from said radius of curvature (R).

21. The method as defined in claim 14, wherein said first incident light beam (L1), said second incident light beam (L2), and said third incident light beam (L3) are laser beams.

22. The device as defined in claim 21, further comprising forming said first incident light beam (L1), said second incident light beam (L2), and said third incident light beam (L3) from a single laser beam by means of two beam splitters (3, 4).

* * * * *